July 11, 1944.   G. A. GOESSLING   2,353,457
SYNTHETIC PEARL RESIN
Filed Oct. 7, 1940

INVENTOR:
Gerald H. Goessling
by Cunliffe & Gravely
HIS ATTORNEYS.

Patented July 11, 1944

2,353,457

UNITED STATES PATENT OFFICE 2,353,457

SYNTHETIC PEARL RESIN

Gerald A. Goessling, Richmond Heights, Mo.

Application October 7, 1940, Serial No. 360,183

12 Claims. (Cl. 18—55)

My invention relates to resins and has for its principal object the production of a resin having an appearance quite similar to pearl, but by synthetic means and entirely without the use of the pearl powders heretofore used in resins and other plastics to produce a pearl effect. This application is a continuation in part of my application Serial No. 278,253, filed June 9, 1939.

In addition to their high cost, the pearl powders commonly used have the disadvantage of being difficult to control, so that they tend to become distributed over the entire surface and give a more or less continuous pearl sheen, that is considerably different from the true pearl appearance, with its high lights and generally variegated appearance. It is a further object of the present invention, therefore, to produce an appearance which is closer to the desired true pearl effect than has been produced by previous processes using pearl powders.

My invention or discovery consists in the production of pearl effects in resins or other plastics by mixing the molding powders of two clear plastics or one clear and one translucent plastic and subjecting the mixture to suitable heat and pressure to produce a molded article which has a distinct pearl-like appearance and luster. Specifically, the invention consists in mixing transparent Lucite and transparent styrene and subjecting the mixture to sufficient heat and pressure, preferably in an injection molding machine, to produce a pearl-like resin.

Figure 1:
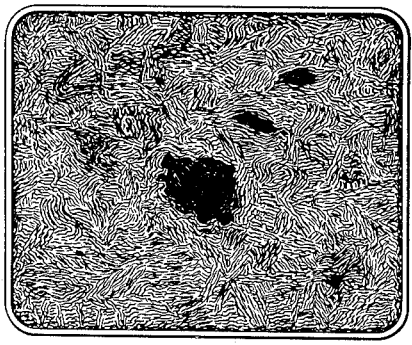
Figure 4:
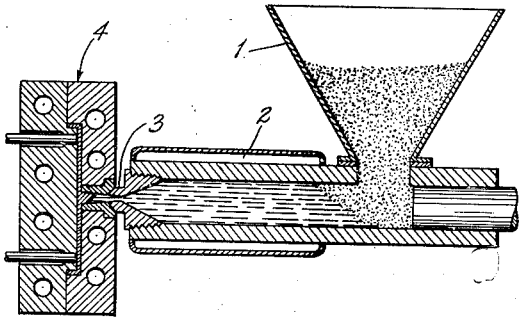
Figure 2:
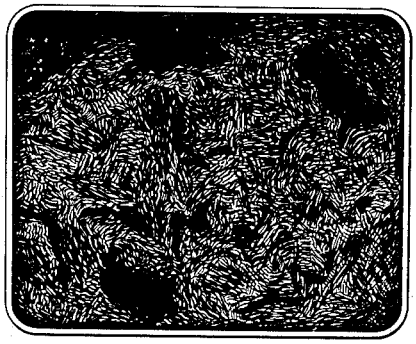
Figure 3:
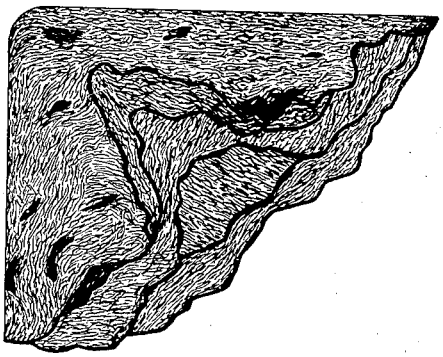
Figure 5:
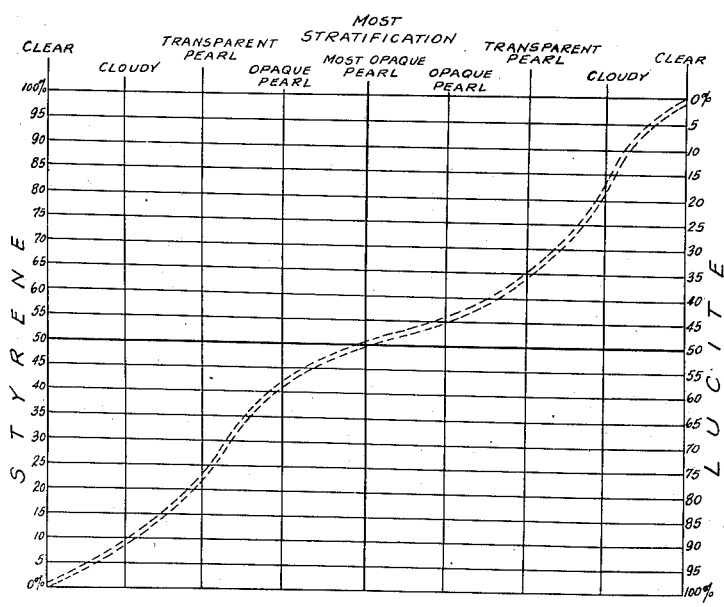

In the accompanying drawing,

Figs. 1 and 2 are views of small trays embodying my invention, the pearl effect with its variations of light and color, being inadequately illustrated, due to the limitations of a black and white drawing, Fig. 3 is a view of a broken specimen, showing the laminated or stratified character of the structure as indicated by the splitting of the body, Fig. 4 is a diagrammatic sectional view of a typical injection molding machine; and Fig. 5 is a diagram showing the effect of varying the proportions of the two ingredients.

I have found that the molding powder of styrene (vinyl benzene) and the molding powder of Lucite (methyl methacrylate) mixed in substantially equal quantities constitute the best raw materials for my composition.

The powders are mixed and to them may be added any desired coloring compound so as to produce any desired color effects in the finished product.

As indicated in Fig. 4, the mixed powders are placed in a hopper 1 from which the mixture is fed into the heating cylinder 2 of any suitable injection molding machine and are heated to a temperature which is a suitable molding temperature for the two ingredients. The temperatures at which the various resins should be molded are well known and the proper temperature for the mixture is thus a matter of computation. Preferably, the two materials should have molding temperatures fairly close to each other. Then the molten mixture is forced, under suitable pressure, through a nozzle 3 into the mold 4 and left there until sufficiently chilled.

The molten materials on being forced into the mold, appear to retain their individuality and constituting a heterogeneous mixture instead of forming a new homogeneous composition. The result is that the structure is made up of a multiplicity of sheets, strips or stratified layers of the respective resins. These several layers or sheets are thoroughly interlaced and intermingled and become firmly united. The result is a laminated or stratified structure, somewhat resembling that of mica, but with the several strips or layers being of much less thickness and being much more closely intermingled and varying in size, shape and angularity of position. Some of said layers may have a rippled or wavy surface and all of the surfaces have a glassy, polished appearance when separated. Thus there results a wide variation of internal shape and structure on the part of the several layers going to make up the complete article, so that there are all sorts of light reflecting surfaces, some large, some small and arranged at many different angles. The top and bottom surfaces are made quite smooth by contact with the die surfaces. The finished product has an opaque appearance, unless held up to the light, when it becomes translucent or transparent. It has a true pearl-like character, being iridescent, having many high lights and varying in color throughout. If the clear molding powders are used without anything else, the finished product has the appearance of a white pearl. By the addition of coloring powders in the quantities desired, any sort of color effect can be obtained. Instead of being uniform throughout the piece, the color also varies after the fashion of color in pearl. Fig. 2 shows patches of distinct color resulting from the use of coloring powder.

Instead of an injection mold, an ordinary compression mold may be used. While the compression molding process produces laminations and results in a pearly effect, the compression mold tends to product layers which are all parallel with the main surfaces, so that there are not the numerous high lights and gradations of shading and color that result from the widely varying shapes of the layers that result from the injection molding process.

The results may be varied by changing the ingredients and the proportions thereof and also by changing the particle sizes of the molding powders. As above stated, equal proportions of clear methyl methacrylate and clear styrene are preferred and result in the most pronounced pearl effect and the most nearly opaque structure. As the proportion of one ingredient is increased, the opacity of the final product decreases, so that the pearl becomes less and less opaque, then what might be called a transparent pearl, and finally when there is only a very small proportion of one ingredient, the result is merely a cloudy mixture. Fig. 6 is a diagram showing the effects obtained by varying the proportions of the styrene and methyl methacrylate. It will be understood that the several points marked as most opaque pearl, opaque pearl and so on, are not precise points, but merely approximations of the effects indicated. As the diagram shows, the pearl effect varies only slightly until one ingredient is considerably in excess of the other, after which there is a sharp drop in the pearl effect.

The thickness of the finished article is also important in selecting the proportions of ingredients. In a very thin section, say around $\frac{1}{16}$ inch, reducing one ingredient to say 5 or 10 per cent would make an article so nearly transparent as to greatly reduce the pearl effect. In a very thick section, however, say ½ inch or more, a small percentage of one ingredient produces an excellent pearl effect.

As one ingredient is used in appreciably larger proportions, the mixture tends to take on the mechanical and physical properties of that ingredient, thus affording further evidence that my final product is a heterogeneous body comprising stratified closely united multiplicity of layers or strips of the respective ingredients and not a homogeneous single compound resulting from the mixing of the two. For instance, as styrene is used in excess of methyl methacrylate, the metallic ring characteristic of styrene becomes more and more pronounced.

The heat should be carefully controlled to produce the best results. The temperature should be selected with regard to the temperature that produces the free flowing plastic condition of the two compounds, in order to produce a stratified effect with a firm bond between the several layers. If the temperature is not properly selected, being either too high or too low, the several parts may not be firmly bonded and the parts may peel away from each other. The molding temperatures for the various resins, as styrene and methyl methacrylate are well known and the proper temperature can be selected. I have found the best temperature for the styrene and methyl methacrylate mixture to be between 380° and 420° F., but lower or higher temperatures may also be used. The free flowing qualities of styrene are well known and I have found that the presence of styrene in the mixture improves the flowing qualities of the methyl methacrylate.

A similar structure, with pleasing effects, although not with a true pearl-like appearance, can be produced by using with a transparent material a material that has been made translucent by the addition of any of the well known ingredients for producing translucence. Either the translucent Lucite or translucent styrene may be used. The result of the use of the material that is only translucent is to minimize the optical effects that produce the pearl-like appearance. However, the appearance thus produced is quite attractive and, so long as some transparent material is used, there is a distinct pearl effect.

After tests of numerous resin mixtures, I have found the Lucite-styrene mixture to be the best, both as to beauty of pearl appearance and as to strength of structure, but other mixtures have been found to be fully satisfactory. One such mixture is that of Vinylite (vinyl chloride) and styrene. Another such mixture is cellulose acetate butyrate and Vinylite (vinyl chloride). The pearl effect can also be produced by the mixture of three or more different resins, as Lucite, Vinylite and styrene.

The requirements are that one resin be transparent and the other or others transparent or translucent and that the resins be sufficiently incompatible that they do not melt into a homogeneous mixture, but preserve their identity in separate strata, which strata are however adherent to each other so as to create a strong structure. All of the specific combinations hereinabove set forth fully satisfy the requirements as do mixtures of other clear resins. In all cases, it is necessary to mold the mixture to produce the desired pearl effect. The final product comprises the polymers of the several resins.

My composition is the first in which the pearl effect of high lights, iridescence and variegated shading is produced by the physical structure and mixture of the composition itself without the aid of pearl powders to produce the pearl-like sheen. The finished product has many uses: its purely decorative character is obvious and its strength is comparable with that of other resins, so that it may be used in almost any place where other resins may be used. By changing the composition and by adding different coloring materials in various amounts, all sorts of color and optical effects may be obtained.

What I claim is:

1. A composition of matter consisting essentially of a molded heterogeneous mixture of at least two clear incompatible thermoplastic resins in the form of a multiplicity of separate, but firmly bonded layers of the respective materials, said layers being of irregular size, shape and arrangement to form a multiplicity of irregularly disposed light reflecting surfaces within the body of the material whereby said composition has the appearance of pearl without the addition of pearl powders.

2. A composite resin having a pearl-like appearance without the addition of pearl powder consisting essentially of a molded mixture of the polymers of styrene and methyl methacrylate characterized by a multiplicity of separate, but firmly bonded, layers of the two materials, said layers being of irregular size, shape and arrangement to form a multiplicity of irregularly disposed light reflecting surfaces within the body of the material.

3. A composite resin consisting essentially of a molded mixture of the polymers of styrene and vinyl chloride characterized by a multiplicity of separate, but firmly bonded, layers of the two materials, said layers being of irregular size, shape and arrangement to form a multiplicty of irregularly disposed light reflecting surfaces within the body of the material whereby said composition has a pearl-like appearance without the addition of pearl powder.

4. A composition of matter consisting essentially of a molded heterogeneous mixture of polymeric styrene and at least one incompatible thermoplastic resin, said composition being characterized by a multiplicty of separate, but firmly bonded, layers of the two materials, said layers being of irregular size, shape and arrangement to form a multiplicity of irregularly disposed light reflecting surfaces within the body of the material, whereby said composition has a pearl-like appearance without the addition of pearl powder.

5. The process comprising mixing clear polymeric methyl methacrylate and polystyrene molding powders without the addition of pearl powders, heating said mixture above the melting point thereof and then molding the same into a stratified body of light reflecting layers having the appearance of pearl.

6. The process comprising mixing polymeric methyl methacrylate and polystyrene molding powders without the addition of pearl powders, heating said mixture above the melting point of said powders and then subjecting the same to heat and pressure to form closely intermingled, stratified layers of irregular shape and arrangement having the appearance of pearl.

7. The process of making a plastic of substantial strength and with a variegated, pearl-like iridescent appearance, which comprises mixing polymeric methyl methacrylate and polystyrene molding powders, heating said mixture above the melting point of said powders and forcing a portion thereof under pressure into an injection mold to form closely intermingled stratified layers having the appearance of pearl.

8. A composition of matter comprising a molded heterogeneous mixture of substantially equal proportions of polystyrene and polymeric methyl methacrylate, said composition having the appearance of pearl without the addition of pearl powders.

9. The process comprising mixing polymeric methyl methacrylate and polystyrene molding powders, one clear and one translucent, without the addition of pearl powders, heating said mixture above the melting point thereof and then molding the same into a stratified body of light reflecting layers having the appearance of pearl.

10. The process of making a plastic of substantial strength and with a variegated, pearl-like iridescent appearance, which comprises mixing substantially equal quantities of polymeric methyl methacrylate and polystyrene molding powders, heating said mixture above the melting point of said powders and forcing a portion thereof under pressure into an injection mold to form closely intermingled stratified layers having the appearance of pearl.

11. The process of making a plastic of substantial strength and with a variegated, pearl-like, iridescent appearance, which comprises mixing substantially equal quantities of polymeric methyl methacrylate and polystyrene molding powders, and a suitable amount of a coloring compound, heating said mixture above the melting point of said powders and forcing a portion thereof under pressure into an injection mold to form closely intermingled stratified layers having the appearance of pearl.

12. A composition of matter in the form of a molded heterogeneous mixture consisting of substantially equal proportions of polystyrene and polymeric methyl methacrylate, said composition having the appearance of pearl.

GERALD A. GOESSLING.